United States Patent
Benjamin et al.

(10) Patent No.: US 7,628,548 B2
(45) Date of Patent: *Dec. 8, 2009

(54) INDEX-MATCHING GEL FOR NANOSTRUCTURE OPTICAL FIBERS AND MECHANICAL SPLICE ASSEMBLY AND CONNECTOR USING SAME

(75) Inventors: Seldon David Benjamin, Painted Post, NY (US); Dana Craig Bookbinder, Corning, NY (US); Timothy Edward Myers, Painted Post, NY (US); Michael Heath Rasmussen, Keller, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/985,509

(22) Filed: Nov. 15, 2007

(65) Prior Publication Data

US 2009/0087150 A1 Apr. 2, 2009

Related U.S. Application Data

(60) Provisional application No. 60/997,165, filed on Oct. 1, 2007.

(51) Int. Cl.
*G02B 6/255* (2006.01)
*G02B 6/032* (2006.01)
(52) U.S. Cl. .............................. 385/98; 385/95; 385/99; 385/125
(58) Field of Classification Search ................ 385/125, 385/95, 98–99
See application file for complete search history.

(56) References Cited

U.S. PATENT DOCUMENTS 5,002,357 A 3/1991 Newell ....................... 350/96.2

(Continued)

FOREIGN PATENT DOCUMENTS

EP 0195355 9/1986

(Continued)

OTHER PUBLICATIONS

Electronics and Communications in Japan, Part 2, vol. 71, No. 11,1988, Translated from Denshi Joho Isushin Gakkai Ronbunshi, vol. 70-C, No. 12, Dec. 1987, pp. 1623-1630, XP009028361, "Direct Core Observation Method Using Thermal Radiation of Silica Fibers with Dopants", Toshiaki Katagira, Massao Tachikura, and Koushi Ishihara, Members NTT Transmission Systems Laboratories, Japan 319-11, ISSN8756-663X/88/0011-0077$7.50/0 © 1988 Scripta Technica, Inc., 9 pages.

(Continued)

*Primary Examiner*—Charlie Peng

(57) ABSTRACT

A polymer based index-matching gel for use with nanostructure optical fibers is disclosed. The index-matching gel has a viscosity $\eta$ at 25° C. of 3 Pa-s$\leq\eta\leq$100 Pa-s, which prevents the index-matching gel from wicking into the voids and down the nanostructure optical fiber to a depth where the fiber performance and/or device performance is compromised. The gel is suitable for use when mechanically splicing optical fibers when at least one of the optical fibers is a nanostructure optical fiber. The gel is also suitable for use in fiber optic connectors wherein at least one of the optical fibers constituting the connection is a nanostructure optical fiber.

19 Claims, 6 Drawing Sheets

U.S. PATENT DOCUMENTS

| | | | |
|---|---|---|---|
| 5,079,300 A * | 1/1992 | Dubrow et al. | 525/106 |
| 5,189,717 A | 2/1993 | Larson et al. | 385/95 |
| 5,311,610 A | 5/1994 | Ladany et al. | 385/92 |
| 5,347,606 A | 9/1994 | Johansen | 385/95 |
| 5,363,461 A * | 11/1994 | Bergmann | 385/78 |
| 5,528,718 A | 6/1996 | Ray et al. | 385/124 |
| 5,657,413 A | 8/1997 | Ray et al. | 385/139 |
| 5,689,607 A | 11/1997 | Vincent et al. | 385/136 |
| 5,802,236 A | 9/1998 | DiGiovanni et al. | 385/127 |
| 5,930,423 A | 7/1999 | Chen et al. | 385/49 |
| 6,648,521 B2 | 11/2003 | Roehrs et al. | 385/84 |
| 6,652,163 B2 | 11/2003 | Fajardo et al. | 385/96 |
| 6,811,328 B2 | 11/2004 | Helbing et al. | 385/95 |
| 6,815,520 B2 * | 11/2004 | Yoneda et al. | 528/31 |
| 6,915,053 B2 | 7/2005 | Hasegawa | 385/124 |
| 6,947,647 B2 | 9/2005 | Beals et al. | 385/100 |
| 6,968,107 B2 | 11/2005 | Belardi et al. | 385/127 |
| 7,529,453 B2 * | 5/2009 | Miyabe et al. | 385/125 |
| 2002/0061176 A1 | 5/2002 | Libori et al. | 385/125 |
| 2003/0081915 A1 | 5/2003 | Fajardo et al. | 385/96 |
| 2004/0067025 A1 | 4/2004 | Haraguchi et al. | 385/49 |
| 2006/0067632 A1 | 3/2006 | Broeng et al. | 385/96 |
| 2006/0204195 A1 | 9/2006 | Kurosawa et al. | 385/125 |
| 2007/0086707 A1 | 4/2007 | Suzuki et al. | 385/58 |
| 2007/0122095 A1 | 5/2007 | Broeng et al. | 385/125 |
| 2007/0196055 A1 * | 8/2007 | Kato et al. | 385/78 |
| 2008/0056655 A1 | 3/2008 | Iida et al. | 385/125 |

FOREIGN PATENT DOCUMENTS

| | | |
|---|---|---|
| EP | 0457903 | 11/1991 |
| EP | 1441243 | 7/2004 |
| EP | 1686402 A1 | 11/2004 |
| EP | 1507154 A1 | 2/2005 |
| GB | 2135077 | 8/1984 |
| JP | 093325225 A2 | 12/1995 |
| JP | 9-325225 | 12/1997 |
| JP | 2003-167145 | 6/2003 |
| JP | 2005-24848 | 1/2005 |
| JP | 2005-24849 | 1/2005 |
| JP | 2005-173575 | 6/2005 |
| JP | 2005-314541 A | 11/2005 |
| JP | 2006-30754 | 2/2006 |
| JP | 2006-221031 A | 8/2006 |
| WO | WO95/31173 | 11/1995 |
| WO | 2005/050273 A1 | 6/2005 |
| WO | 2006/050974 A1 | 11/2005 |

OTHER PUBLICATIONS

Optical Fiber Communication Conference, 1992 Technical Digest Series, vol. 5, Conference Edition, /OFC'92/Thursday Afternoon, Publication Date: Feb. 2, 1992, 2:45PM, THL5 "Core alignment technique based on image processing of warm fibers", Wenxin Zheng, Ola Hulten, Ericsson Cables AB, Division of Network Products, 172 87 Sundbyberg, Sweden, 2 pages.

8217 Journal of Lightwave Technology (Apr. 11, 1993), No. 4, New York, US, LOGY, vol. 11, No. 4, Apr. 1993 "Real Time Control of Arc Fusion for Optical Fiber Splicing", Wenxin Zheng, 0733-8724/93$03.00 © 1993 IEEE, 6 pages.

XP-002434945, IEEE Photonics Technology Letters, vol. 15, No. 17, Jul. 2003, "An Effective Splicing Method on Photonic Crystal Fiber Using $CO_2$ Laser", Joo Hin Chong, M. K. Rao, Yinian Zhu, and Ping Shum, Member, IEEE, 1041-1135/03$17.00 © 2003 IEEE, 4 pages.

XP-001035305, "Towards Practical Fibre Technology: Fabrication, Splicing and Characterization", P. J. Bennett, N. G. R. Broderick, D. J. Richardson, Optoelectronics Research Centre, University of Southampton, Southampton S017 1BJ, UK, (pjb@orc.soton.ac.uk, tmm@orc.soton.ac.uk, ngb@orc.soton.ac.uk, djr@orc.soton.ac.uk, ECOC '99, Sep. 26-30, 1999, Nice France, 4 pages.

IEICE Trans. Electron., vol. E89-C, No. 2 Feb. 2006, XP-001241540, Paper, "Holey Fibers for Low Bending Loss", Ning Guan[† a)], Member, Katsuaki Izoe, Nonmember, Katsuhiro Takenaga[†], Ryuji Suzuki[†,]Members, Kazuhiko Aikawa[†], Nonmember, and Kuniharu Himeno[†], Member, Copyright © 2006 The Institute of Electronics, Information and Communication Engineers, Manuscript received Jun. 20, 2005, Manuscript revised Sep. 5, 2005, [†]The authors are with the Optics and Electronics Laboratory, Fujikura Ltd., Sakura-shi, 285-8550 Japan. a) E-mail: guan@lab.fujikura.co.jp DOI: 10.1093/ietele/e89-c.2.191, 6 pages.

OZ Optics, www.ozoptics.com, 219 Westbrook Rd. Ottawa, ON, Canada, K0A 1L0, "High Power Fiber Optic Patchcords (Patent Pending)", DTS0037, May 19, 2006, 6 pages.

OE Magazine—guiding light with holey fibers, oe magazine, The SPIE Magazine of Photonics Technologies and Applications, "Guiding Light with Holey Fibers", René Engel Kristiansen, Crystal Fibre A/S, http://oemagazine.com/fromtheMagazine/jun02/tutorial.html, Mar. 21, 2007, 8 pages.

"Simply-Structured Optical Terminators using Adhesive Polymer for Fiber Contact", M. Tachikura, M. Wakasa, T. Nishio, Advanced Cable Systems Corp., 5-1-1 HItaka-cho, Hitachi-shi Ibaraki-ken, Japan, Phone +81-294-43-3777, Fax: +81-294-43-1190, tachikura.masao@advanced-cable.co.jp, K. Suzuki, Y. Kato, K. Ohsono, Hitachi Cable Ltd., 5-1-1 HItaka-cho, Hitachi-shi Ibaraki-ken, Japan, N. Hasimoto and T. Furue, Tomoegawa Co., Ltd., 3-1 Tomoe-cho, Suruga-ku, Shizuoka-shi Japan, © 2006 Optical Society of America, OCIS codes: (060.0060) Fiber optics and optical communications; (060.2340) Fiber optics components, 3 pages.

"Field Installable Connector Optimized for Holey Fiber", Y. Kato, K. Suzuki, and K. Ohsono, Hitachi Cable Ltd., Hitaka Works, 5-1-1 Hitaka, Hitachi, Ibaraki, Japan, Phone +81-294-25-2827, Fax: +81-294-43-7487, E-mail: kato.yoshihisa@hitachi-cable.co.jp, M. Wakasa, Y Nakatani, T. Nishio, and M. Tachikura, Advanced Cable Systems Corp., 5-1-1 Hitaka, Hitachi, Ibaraki, Japan, © 2007 Optical Society of America, OCIS codes: (060.0060) Fiber optics and optical communications; (060.2340) Fiber optics components, 3 pages.

Inoue, et al., "Molecular Weight Evaluation of Poly(dimethylsiloxane) on Solid Surfaces Using Silver Deposition/TOF-SIMS," Analytical Sciences, vol. 20, Dec. 2004, 6 pages.

Patent Cooperation Treaty, International Search Report for International Application No. PCT/US2008/011191, Feb. 9, 2009, 2 pages.

"Microstructured fiber splicing", Bruno Bourliaguet, Claude Paré, Frédéric Émond and André Croteau, Dec. 15, 2003/vol. 11, No. 25/Optics Express 3412, 6 pages.

"Fabrication of selective injection microstructured optical fibers with a conventional fusion splicer", Limin Xiao, Wei Jin, M. S. Demokan, Hoi L. Ho, Yeuk L. Hoo, and Chunliu Zhao, Oct. 31, 2005 / vol. 13, No. 22 / Optics Express 9014, 9 pages.

"Photonic Band Gap Guidance in Optical Fibers", J. C. Knight, et al. Science 282, 1476 (1998); DOI: 10.1126/science.282.5393.1476, www.sciencemag.org, Dec. 18, 2007; 4 pages.

Journal of Lightwave Technology, vol. 23, No. 11, Nov. 2005, "Low-Bending-Loss Single-Mode Fibers for Fiber-to-the-Home", Kuniharu Himeno, Shoichiro Matsuo, Ning Guan, Member, IEEE, and Akira Wada, Member, IEEE, 6 pages.

"New Core Alignment Fusion Splicer FSM-50S", Shigeru Saito, Katsumi Sasaki, Kenji Takahashi, Koji Ohzawa, Taku Otani and Srachate Chumpol; Fujikura Technical Review, 2005.

"Arc-fusion Splicing Techniques for Holey Fibers", Takahiro Hamada, Ryuji Suzuki, Katsuhiro Takenaga, Ning Guan, Shoichiro Matsuo and Kuniharu Himeno; Fujikura Technical Review, 2006.

* cited by examiner

INDEX-MATCHING GEL FOR NANOSTRUCTURE OPTICAL FIBERS AND MECHANICAL SPLICE ASSEMBLY AND CONNECTOR USING SAME

CROSS REFERENCE TO RELATED APPLICATION

This application claims the priority pursuant to 35 U.S.C. § 119(e) to U.S. Provisional Application Ser. No. 60/997,165, filed Oct. 1, 2007.

BACKGROUND OF THE INVENTION

1. Field of the Invention

The present invention relates generally to index-matching materials used for splicing optical fibers, and in particular relates to index-matching gels suitable for use with nanostructure optical fibers, and the use of such gels in mechanical splice assemblies and fiber optic connectors.

2. Technical Background

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

The ever increasing and varied use of optical fibers has spurred the use of fiber optic connectors. Fiber optic connectors are used to terminate the ends of optical fibers, and enable quicker connection and disconnection than fusion splicing. A typical connector holds the end of each optical fiber in a ferrule. The ferrule serves to align the respective cores of the two fibers so that light can pass between the ends of the fibers.

Connectors have traditionally been one of the main concerns in using fiber optic systems because they introduce loss and because different connector types were typically not compatible. While the use of connectors was once problematic, manufacturers have taken steps to standardize and simplify them. This increasing user-friendliness has contributed to the increase in the use of fiber optic systems.

To efficiently transmit optical signals between two optical fibers, a connector must not significantly attenuate or alter the transmitted signals. However, while connectors provide an easy way to connect two optical fibers (or sets of optical fibers), they also introduce attenuation, which is typically in the range from about 0.05 dB to 0.5 dB. To mitigate attenuation effects in the connector, an index-matching material (typically, a fluid) is often used. The index-matching material is held within the connector so that it presents itself at the interface between the two fiber ends. The index-matching material serves to reduce attenuation due to reflections from the index mismatch at the fiber-fiber interface.

SUMMARY OF THE INVENTION

An aspect of the invention is a polymer based index-matching gel for use with nanostructure optical fibers. The index-matching gel has at least one polymer component that preferably has a viscosity $\eta$ at 25° C. of 3 Pa-s $\leq \eta \leq$ 100 Pa-s, which prevents the index-matching gel from wicking into the voids and down the nanostructure optical fiber to a depth where the fiber performance and/or device performance is compromised. The gel is suitable for use when mechanically splicing optical fibers when at least one of the optical fibers is a nanostructure optical fiber. The gel is also suitable for use in fiber optic connectors wherein at least one of the optical fibers constituting the connection is a nanostructure optical fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Reference is now made in detail to the present preferred embodiments of the invention, examples of which are illustrated in the accompanying drawings. Whenever possible, the same reference numbers and symbols are used throughout the drawings to refer to the same or like parts.

There are a number of "nanostructure" (or "holey") optical fibers on the market today that have one or more regions with periodically or aperiodically arranged small holes or voids, which make the fiber extremely bend insensitive. Examples of such optical fibers are described in, for example, U.S. Pat. No. 6,243,522, pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; 60/841,490 filed Aug. 31, 2006; and 60/879,164, filed Jan. 8, 2007 (hereinafter, "the Corning nanostructure fiber patents and patent applications"), all of which are assigned to Corning Incorporated and all of which are incorporated by reference herein.

One type of nanostructure optical fiber developed by Corning, Inc. has an annular ring of non-periodic airlines (of diameter ~$1 \times 10^{-7}$ m) that extend longitudinally (axially) along the length of the fiber. The region with the ring of airlines has a reduced apparent or average index of refraction, because air has an index of refraction of approximately 1 compared to the fused silica matrix refractive index of approximately 1.46. The ring of airlines is positioned to create a refractive index profile that enables superior bend performance (optically) and significantly smaller minimum bend radius specifications.

The use of nanostructure optical fibers in combination with index-matching material, however, can be problematic. Certain index-matching materials are commonly used for non-nanostructure optical fibers. However, such materials could possibly migrate (or "wick") into the airlines (voids) from the fiber end-face over time. This movement may also occur with variations in temperature. Filling the airlines with a material index-matched to silica raises their index of refraction from approximately 1 to approximately 1.46, resulting in a change in the fiber index profile, which leads to increased optical loss when the fiber is bent. This reduces or eliminates an important property of enhanced bend performance of the nanostructure fiber. Likewise, in a nanostructure fiber in the form of a photonic crystal fiber or "holey fiber," the fiber attenuation (straight fiber) is increased substantially when the holes are filled with an index-matching material.

Example Nanostructure Optical Fiber Cable

The index-matching gel of the present invention is suitable for use in connection with nanostructure optical fibers, and in particular for forming mechanical splices with one or more of such fibers in mechanical splice assemblies used in fiber optic connectors.

Figure 1:
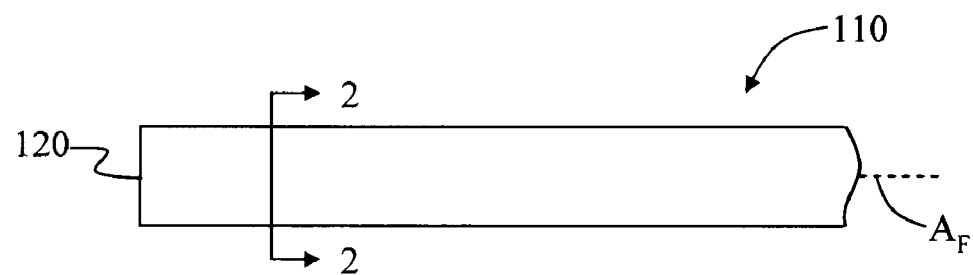
FIG. 1 is a schematic side view of an end section of a nanostructure optical fiber cable.
Figure 2:
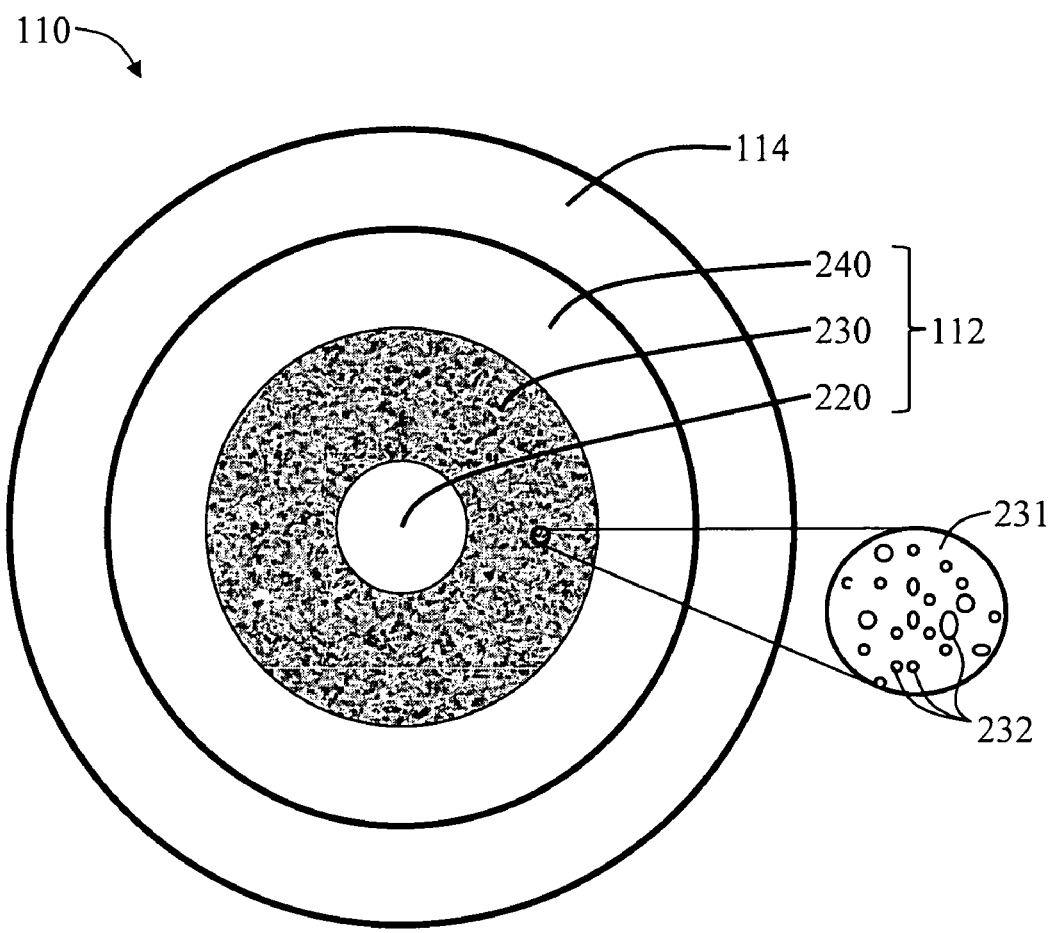
FIG. 2 is a cross-sectional diagram of the nanostructure optical fiber cable of FIG. 1 as viewed along the direction 2-2, and includes an inset showing a close-up view of the void structure for an example embodiment of a nanostructure region having non-periodically arranged voids.

FIG. 1 is a schematic side view of a section of an example embodiment of nanostructure optical fiber cable 110 that includes a nanostructure optical fiber 112 with a protective cover 114. Nanostructure optical fiber 112 has an end 120 and a central axis $A_F$. FIG. 2 is a schematic cross-section of cable 110 as viewed along the direction 2-2 in FIG. 1. Nanostructure optical fiber cable 110 can include, for example, any one of the various types of nanostructure optical fibers 112, such as any of the so-called "holey" fibers, or those described in the above-mentioned Corning nanostructure fiber patents and patent applications. In an example embodiment, nanostructure optical fiber 112 includes a core region ("core") 220, a nanostructured region 230 surrounding the core, and a cladding region 240 ("cladding") surround the nanostructured region. Other ring-type configurations for nanostructure optical fiber 112 are also known.

In an example embodiment, nanostructured region 230 comprises a glass matrix ("glass") 231 having formed therein non-periodically disposed holes (also called "voids" or "airlines") 232, such as the example voids shown in detail in the magnified inset of FIG. 2. In another example embodiment, voids 232 may be periodically disposed, such as in a photonic crystal optical fiber, wherein the voids typically have diameters in between about $1 \times 10^{-6}$ m and $1 \times 10^{-5}$ m. Voids 232 may also be non-periodic airlines. In an example embodiment, glass 231 is fluorine-doped while in another example embodiment the glass is undoped pure silica. By "non-periodically disposed" or "non-periodic distribution," it is meant that when one takes a cross-section of the optical fiber (such as shown in FIG. 2), the voids 232 are randomly or non-periodically distributed across a portion of the fiber. Cross sections similar to FIG. 2 taken at different points along the length of nanostructure optical fiber 110 will reveal different cross-sectional hole patterns, i.e., various cross-sections will have different hole patterns, wherein the distributions of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend the entire length of the entire fiber for typical lengths of transmission fiber. While not wishing to be bound by theory, it is believed that the holes extend less than a few meters, and in many cases less than 1 meter along the length of the fiber.

If non-periodically disposed holes/voids 232 are employed in nanostructured region 230, it is desirable in one example embodiment that they be formed such that greater than 95% of and preferably all of the holes exhibit a mean hole size in the cladding for the optical fiber which is less than 1550 nm, more preferably less than 775 nm, most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× to about 4000× and image analysis software, such as ImagePro, which is available from Media Cybernetics, Inc. of Silver Spring, Md., USA.

In an example embodiment, holes/voids 232 can contain one or more gases, such as argon, nitrogen, or oxygen, or the holes can contain a vacuum with substantially no gas; regardless of the presence or absence of any gas, the refractive index of the hole-containing region is lowered due to the presence of the holes. The holes can be non-periodically or non-periodically disposed, while in other embodiments the holes are disposed periodically. In some embodiments, the plurality of holes comprises a plurality of non-periodically disposed holes and a plurality of periodically disposed holes. Alternatively, or in addition, as mentioned above the depressed index can also be provided by downdoping the glass in the hole-containing region (such as with fluorine) or updoping one or both of the surrounding regions.

Nanostructured region 230 can be made by methods that utilize preform consolidation conditions, which are effective to trap a significant amount of gases in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose endpoints are disposed on the silica internal surface defining the hole when the optical fiber is viewed in perpendicular cross-section transverse to the optical fiber central axis $A_F$.

An example nanostructure fiber 112 was analyzed in connection with using the index-matching gel 100 of the present invention. SEM analysis of the end face of an example nanostructure optical fiber 112 showed an approximately 4.5 micron radius GeO2-SiO2 void-free core (having an index of approximately +0.34 percent delta verses silica) surrounded by a 11 micron outer radius void-free near clad region surrounded by 14.3 micron outer radius non-periodic void-containing cladding region (ring thickness of approximately 3.3 microns), which is surrounded by a void-free pure silica outer cladding having an outer diameter of about 125 microns (all radial dimensions measured from the center of the optical fiber).

The nanostructure region comprised approximately 2.5 percent regional area percent holes (100 percent N2 by volume) in that area with an average diameter of 0.28 microns and the smallest diameter holes at 0.17 microns and a maximum diameter of 0.48 microns, resulting in about 130 total number of holes in the fiber cross-section. The total fiber void area percent (area of the holes divided by total area of the optical fiber cross-section×100) was about 0.05 percent. Optical properties for this fiber were 0.36 and 0.20 dB/Km at 1310 and 1550 nm, respectively, and a 22 meter fiber cable cutoff of about 1250 nm, thereby making the fiber single mode at wavelengths above 1250 nm.

Index-Matching Gel

An example of a common index-matching material used today with conventional (i.e., non-nanostructured) optical fibers is a low-viscosity index polymer with a molecular weight typically less than 30,000 Daltons to which is added a small amount of gelling agent, such as fumed silica or metal soap to make the gel phixotropic. Such materials are popular because they are inexpensive and do not require significant technical expertise to manufacture.

Although index-matching gels having certain refractive indices can be formed using polymers, and methods for their production are known in the prior art, the importance of higher molecular weight (Mw) gels in connection with nanostructure optical fibers has heretofore not been recognized. Unfortunately, conventional index-matching materials are not suitable for fiber splicing when one of the optical fibers is a nanostructure optical fiber. This is because the index-matching material could fills voids 232 at end 120 of the nanostructure optical fiber and thus change the effective refractive index of nanostructured region 232 at the fiber end. This, in turn, leads to undesirable loss at the fiber-fiber interface, as well as a deterioration in bend performance.

Figure 3A:
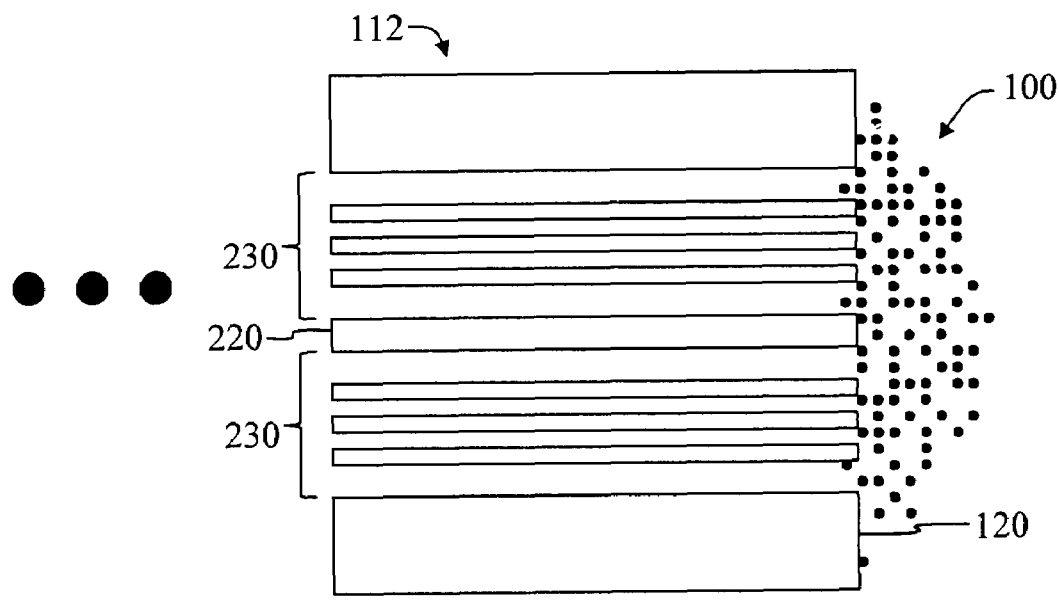
FIG. 3A is a schematic cross-sectional diagram of an end section of an example nanostructure optical fiber as viewed along the length of the fiber, wherein the fiber has periodic voids, illustrating how the index-matching gel of the present invention does not substantially fill the nanostructure voids at the end of the nanostructure optical fiber.

Accordingly, the present invention includes mechanical splice assembly 10 (described below in connection with FIG. 6 through FIG. 8) and a connector 300 (described below in connection with FIG. 9) that include an index-matching gel 100 according to the present invention, wherein the gel is constituted in one example embodiment so that it does not substantially fill voids 232 at fiber end 120, as illustrated in FIG. 3A.

Figure 3B:
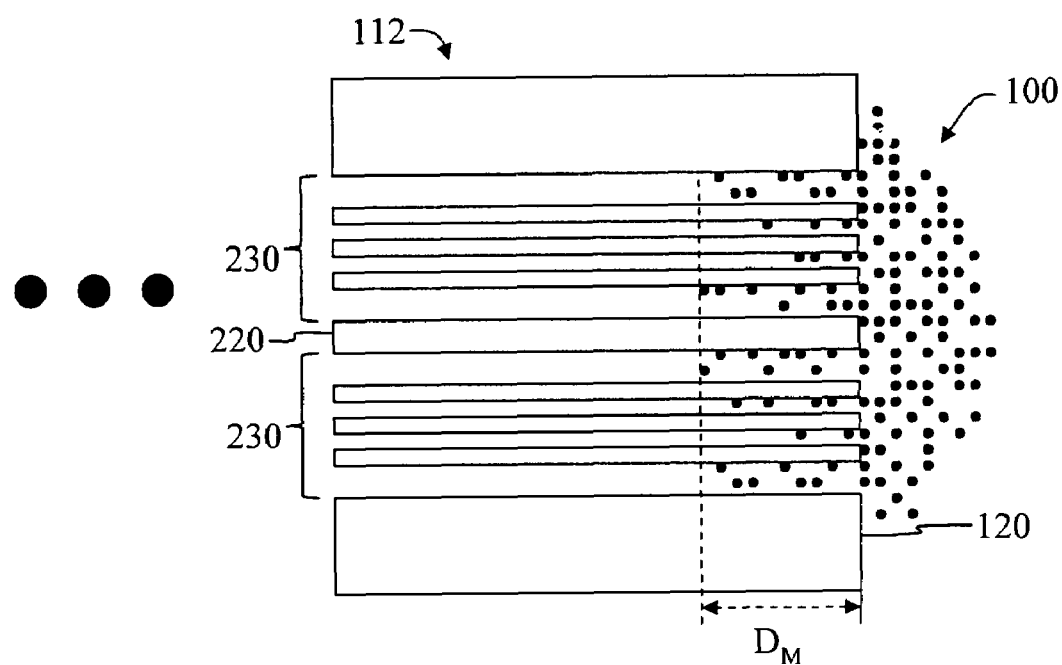
FIG. 3B is a schematic diagram similar to FIG. 3A, illustrating an example embodiment wherein the index-matching gel of the present invention migrates into the nanostructure voids to a maximum depth $D_M$.
Figure 4A:
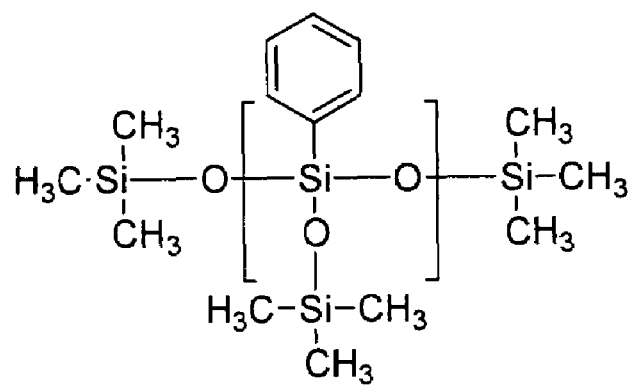
FIG. 4A illustrates an example index-matching gel chemical formulation for an example embodiment of a siloxane polymer according to the present invention, wherein the siloxane polymer is a trimethyl terminated-trimethylsiloxyphenylsiloxane polymer.
Figure 4B:
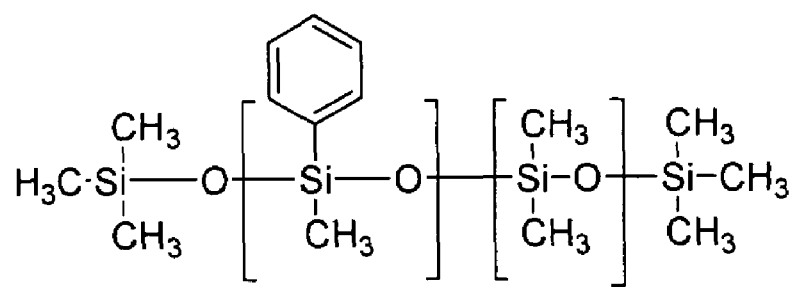
FIG. 4B illustrates an example index-matching gel chemical formulation for an example embodiment of a siloxane polymer gel according to the present invention, wherein the siloxane polymer is a trimethyl terminated-phenylmethylsiloxane-dimethylsiloxane copolymer.
Figure 4C:
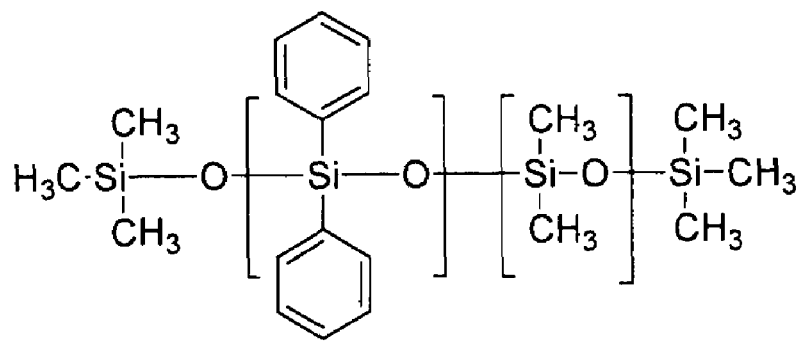
FIG. 4C illustrates an example index-matching gel chemical formulation for an example embodiment of a siloxane polymer gel according to the present invention, wherein the siloxane polymer is a trimethyl terminated-diphenylsiloxane-dimethylsiloxane copolymer.

As illustrated in FIG. 3B, in an example embodiment of the invention, index-matching gel 100 is capable of migrating into voids 232 to a depth $D_M$ as measured from fiber end 120. However, unlike conventional index-matching gels, the gel of the present invention that migrates into voids 232 only does so to a limited maximum depth $D_M$ that does not substantially impair the functionality of fiber relative to its intended use. For example, nanostructure optical fiber 112 may be used in a connector (i.e., is connectorized), and depth $D_M$ may be such that the maximum extent of the gel migration does not extend to beyond the connector housing, or beyond the connector boot (which in an example embodiment of a present-day fiber optic connector would be about 40 mm). Since the portion of nanostructure optical fiber 112 held within the connector housing or the connector boot is not likely to be subject to significant bending forces, the filling of voids 232 by gel migration to a limited depth $D_M$ in such a case does not present a significant risk of performance reduction.

An example embodiment gel 100 of the present invention is based on a siloxane polymer having the following general chemical formula:

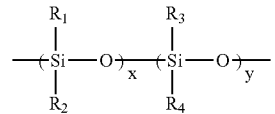

wherein $R_1$, $R_2$, $R_3$ and $R_4$ can be the same, or can be different. The group may include a $C_1$-$C_{12}$ alkyl group (e.g. methyl, ethyl and the like), a $C_1$-$C_{12}$ alkoxy group (e.g. methoxy, ethyoxy and the like), an aromatic group, a halogenated (F, Cl, Br; most preferred Cl) aromatic or alkyl group, or trimethylsiloxy.

The refractive index of a polysiloxane polymer component is adjustable by the inclusion of diphenyl siloxane or phenyl-methyl siloxane. Although other refractive-index-modifying groups such as cyclo-alkyl groups or aromatic groups can also be used, typical copolymers for optical index matching compositions include dimethylsiloxane-phenylmethylsiloxane co-polymers or dimethylsiloxane-diphenylsiloxane co-polymers. Mixtures of two or more silicones polymers containing nearly the same aryl-alkyl (typically phenyl-methyl) ratio, at least one having a higher and one having a lower viscosity, can be mixed to obtain the correct viscosity and a refractive index to match optical core. In some cases mixtures of two or more polymers (preferably, silicones, having different viscosities, at least one having a higher and one having a lower viscosity, and different refractive indices, at least one having a higher and one having a lower refractive index, can be mixed to, can be mixed to obtain the correct viscosity and a refractive index to match core 220. These formulations may not perfectly match the refractive index of core 220, but the matches can be made sufficiently close (at a wavelength of operation of the fiber) to avoid significant attenuation of the signal over the short path lengths within fiber optic connectors.

At a phenyl content of approximately 12-15 mole %, a polydimethyl siloxane/methylphenylsiloxane co-polymer has a refractive index that substantially matches that of fiber core 220 while rendering the index matching gel transparent or substantially transparent at the wavelengths used in optical fiber communications. Other co- or ter-polymers that contain the appropriate proportion of aryl and alkyl groups also produce gels 100 that are transparent and index matching. Refractive index $n_i$ matching of the gel to the fiber core when measured at 25° C. and at approximately 589.3 nm wherein $\leq 5\%$, more preferably $\leq 2\%$, most preferably $\leq 1\%$.

In an example embodiment, the polymer (polymer component) in gel 100 has a molecular weight Mw such that its viscosity at 25° C., when applied to the connector/nanostructured fiber, is in a range from 3 to 100 Pa-s, preferably 5 to 50 Pa-s, most preferably 5 to 20 Pa-s. An example embodiment of siloxane polymer gel 100 has a molecular weight Mw>25,000 daltons. In another example embodiment, siloxane polymer gel 100 has a molecular weight in the range from 25,000 daltons<Mw<50,000 daltons. In a further example embodiment, siloxane polymer gel 100 has a molecular weight Mw <50,000 daltons for a, cross-linkable version of the gel.

In an example embodiment, the molecular weight Mw of gel 100 is optimized for a particular type of nanostructure optical fiber 112. For example, a nanostructure optical fiber 112 that includes photonic crystals has relatively large voids (e.g., diameter $\sim 1 \times 10^{-6}$ to $\sim 1 \times 10^{-5}$ m) and so may require a gel having a molecular weight Mw on the high-end of the range.

The liquid polymers may comprise a composition capable of being further polymerized or crosslinked by means of heat or actinic radiation. Such compositions may contain monomers, oligomers, and higher molecular weight, liquid pre-polymers (including liquid silicone pre-polymers) having the required refractive index that have attached thereto vinyl, acrylate, epoxy, isocyanate, silane, hydrosilane, and other polymerizable functional groups well known to those skilled in the polymer art. Typically polymerizable compositions also contain initiators, catalysts, accelerators, sensitizers, and the like to facilitate the polymerization process.

Other embodiments of the invention include polymeric index matching materials selected from the group of polymers or polymer mixtures such as polybutenes, (meth)acrylates, acrylics, epoxies, polyesters, polyethers, polycaprolactones, polycarbonates, polybutadienes, polyurethanes, natural hydrocarbons, and other polymers well known to those skilled in the polymer art, including blends and copolymers of the above.

In an example embodiment, gel 100 is index-matched to provide the least possible amount of optical loss from reflection at fiber-fiber interface 122 formed by stub-fiber end 72 and nanostructure optical fiber end 120. In another example embodiment, gel 100 may be index matched (or non-index matched, as the case may be) and applied to end 120 of nanostructure optical fiber 100 to "seal" the end to prevent the ingress of other materials in the ambient environment. This may be done, for example, in connection with the treatment of cable ends or hardware cable stubs during shipment or installation to prevent migration of water, oils, etc, into voids 232 at open fiber end 120.

Comparison of Index-Matching Gels

An example embodiment of index-matching gel 100 of the present invention was compared to a prior art index-matching gel. In both gels, the viscosity for the polymers used was measured at approximately 25° C. in a cone and plate rheometer at a shear rate $\gamma$ of 12 $\text{sec}^{-1}$.

The prior art index-matching gel was a low viscosity polymer made up of dimethyl-diphenyl silicone copolymer and having a viscosity of approximately 1.5 Pa-s, a weight average molecular weight Mw of approximately 24000 daltons, and a polydispersity of approximately 1.7 (measured vs. polystyrene standard). Gel 100 of the present invention was a high viscosity polymer made up of dimethyl-diphenyl silicone copolymer and had a viscosity of approximately 8 Pa-s, a weight average molecular weight of approximately 49000 daltons, and a polydispersity of approximately 2.1 (measured vs. polystyrene standard). Both gels had refractive indices of approximately 1.46 at 593 nm measured at 25° C. Gels made from these polymers comprised approximately 5 weight percent fumed silica (e.g., Cabosil™ TS-720), which makes the gels phixotropic and thus suitable for use in a splicing assembly and/or fiber optic connector.

In one test, both index matching gels were used in respective field installable connectors. The connectors were cycled between −40 and +75° C. following Bellcore GR326 temperature cycling for 14 days, and a macrobend attenuation increase for a 10 mm diameter bend at the end of the connector boot, which is approx 40 mm from the fiber end-face, was measured. For the high viscosity polymer-based gel of the present invention, the macrobend attenuation increase was <0.05 dB/turn, while for the low viscosity polymer-based prior art gel, the macrobend attenuation was >0.5 dB/turn.

Figure 5:
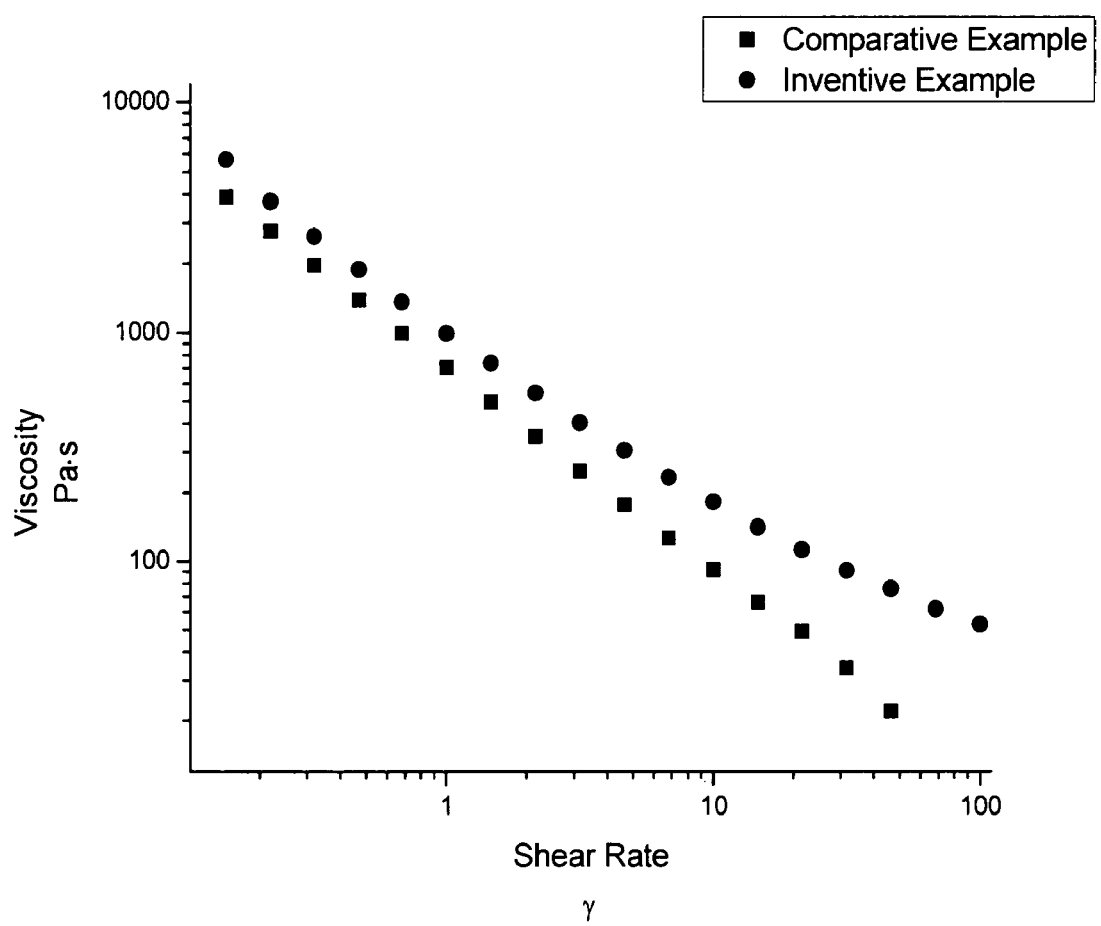
FIG. 5 is a log-log plot of viscosity (Pa-s) vs. shear rate for a prior art low-viscosity index-matching gel (the "comparative example") and an example embodiment of the index-matching gel of the present invention (the "inventive example")

FIG. 5 is a log-log plot of the viscosity (Pa-s) as a function of sheer rate $\gamma$ ($s^{-1}$) for the above-described high and low viscosity gels (the "inventive example" and the "comparative example," respectively). As can be seen from the plot, the example index-matching gel of the present invention has a substantially higher viscosity as a function of the sheer rate than the prior art index-matching gel. This property corresponds to the reduced macrobend attenuation of the high-viscosity gel of the present invention. The reduced macrobend attenuation associated with the index-matching gel of the present invention is due to the lack of migration of the gel into the voids as compared to the prior art low-viscosity index-matching gel.

Example Mechanical Splice Assembly

Aspects of the present invention include mechanical splice assemblies, and fiber optic connectors having such splice assemblies, that utilize the index-matching gel of the present invention. This makes the mechanical splice assemblies and connectors suitable for use with one or more nanostructure optical fibers, such as those described in the aforementioned Corning nanostructure fiber patents and patent applications. The example embodiment of the mechanical splice assemblies and fiber optic connectors of the present invention as described hereinbelow are based on simplified assemblies and connectors in order to illustrate the underlying principles of the invention. One skilled in the art will recognize that the assemblies and connectors of the present invention as described herein can be implemented with a number of specific types of fiber optic connectors, such as those described in U.S. Pat. Nos. 4,923,274, 6,816,661 and 7,104,702, which patents are incorporated by reference herein.

Figure 6:
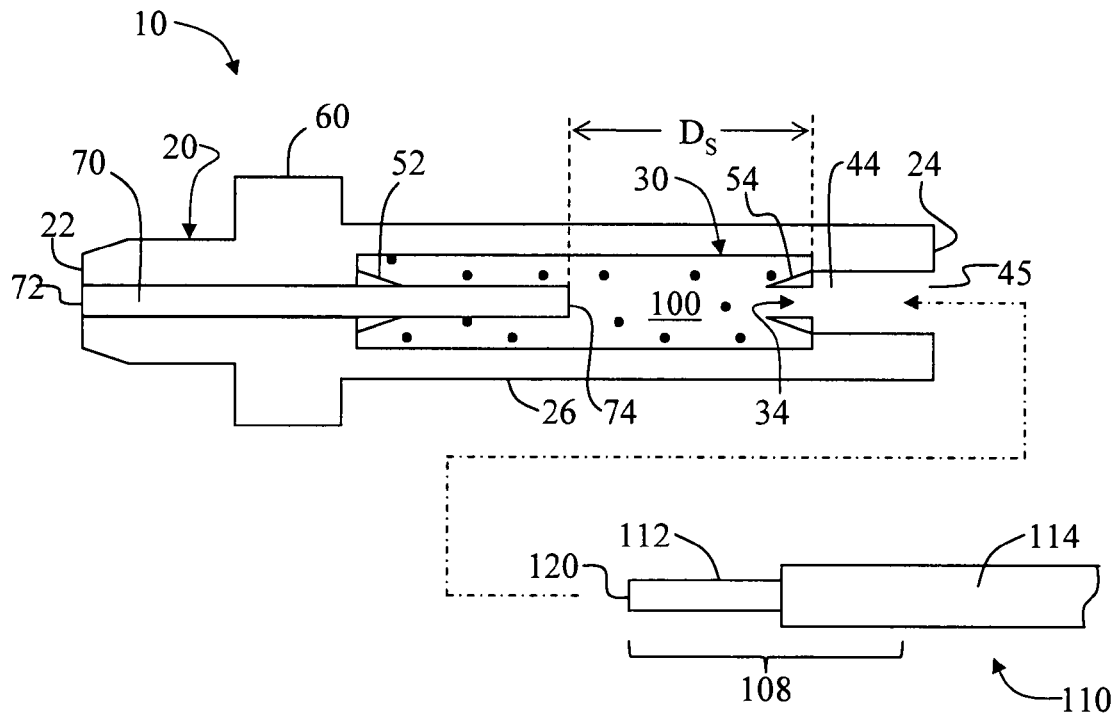
FIG. 6 is a schematic cross-sectional diagram of an example embodiment of a mechanical splice assembly according to the present invention, showing the index-matching gel held in the assembly, the nanostructure optical fiber cable prior to being incorporated into the assembly.
Figure 7:
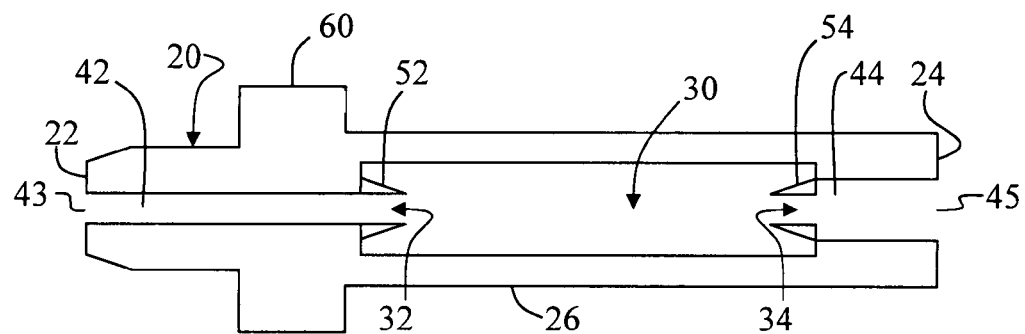
FIG. 7 is a schematic cross-sectional diagram of the ferrule of FIG. 6.

FIG. 6 is a schematic cross-sectional view of an example embodiment of a mechanical splice assembly 10 according to the present invention. Assembly 10 includes a ferrule 20, which is shown by itself in FIG. 7 for ease of illustration and explanation. With reference to FIG. 7, ferrule 20 includes first and second ends 22 and 24, and outer surface 26. Ferrule 20 includes an interior chamber 30 with front and rear open ends 32 and 34 that open to respective front and rear channels 42 and 44. Front channel 42 includes an open end 43 at ferrule end 22, and rear channel 44 has an open end 45 at ferrule end 24. Optical fiber channel 42 is sized to accommodate a bare optical fiber, while optical fiber channel 44 is sized to accommodate a field optical fiber that includes its protective cover, as discussed below.

Assembly 10 further includes frontward and rearward guides 52 and 54 arranged within chamber 30 at front and rear openings 32 and 34, respectively. Guides 52 and 54 are sized to pass a bare optical fiber and support the optical fiber within chamber 30. In an example embodiment, assembly 10 includes a retaining ring 60 on outer surface 26 at or near ferrule end 22 so that the assembly can reside within a ferrule holder of a fiber optic connector, as discussed below.

With reference again to FIG. 6, assembly 10 includes a section of optical fiber 70, referred to as a "fiber stub," arranged in front channel 42 and that passes through front guide 52 such that a portion of the fiber stub protrudes part way into chamber 30. Fiber stub 70 includes a front end 72 that is polished and flush with ferrule end 22. Fiber stub 70 also includes a rear end 74 that resides within chamber 30 and that is flat or cleaved at an angle. Chamber 30 is filled with an index-matching high-molecular-weight gel 100, which is described in greater detail below. Fiber stub 70 may be formed from either a nanostructure optical fiber or a non-nanostructure optical fiber.

With continuing reference to FIG. 6, mechanical splice assembly 10 is adapted to accommodate, via ferrule end 24, an end-portion 108 of nanostructure optical fiber cable 110, including protective cover 114. Nanostructure optical fiber end 120 is preferably flat or cleaved when used in assembly 10.

Figure 8:
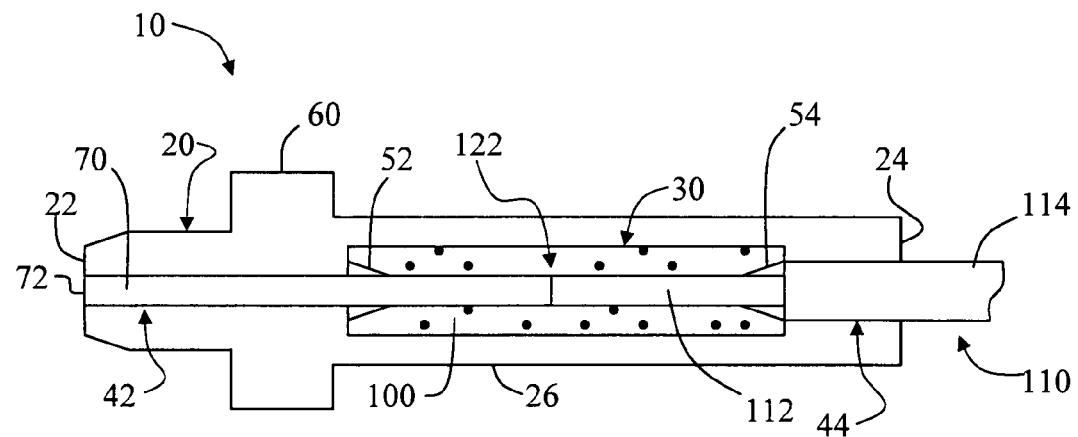
FIG. 8 is the same mechanical splice assembly as shown in FIG. 6, but now with the nanostructure optical fiber cable incorporated into the assembly.

FIG. 8 is a schematic side view similar to FIG. 6, illustrating the nanostructure optical fiber cable 110 incorporated into mechanical splice assembly 10. Nanostructure optical fiber 112 is introduced into rear channel 44 at ferrule rear end 24 and is passed through rear guide 54 until nanostructure optical fiber end 120 interfaces with fiber stub rear end 74 in chamber 30 at fiber-fiber interface 122. Nanostructure optical fiber cable 110 is also held in rear channel 44, which is sized to fit the cable with outer jacket 114. In order to ensure a proper fit of end portion 108 of nanostructure optical fiber cable 110 in assembly 10, outer jacket 114 is stripped back by a length corresponding to the distance Ds between fiber stub rear end 74 and rear chamber opening 34 (FIG. 6).

Note that in an example embodiment of the mechanical splice assembly 10 of FIG. 6, stub fiber 72 may be formed from a section a nanostructure optical fiber, and the field optical fiber described above as a nanostructure optical fiber cable 110 may be a non-nanostructure optical fiber cable.

Example Connector

Figure 9:
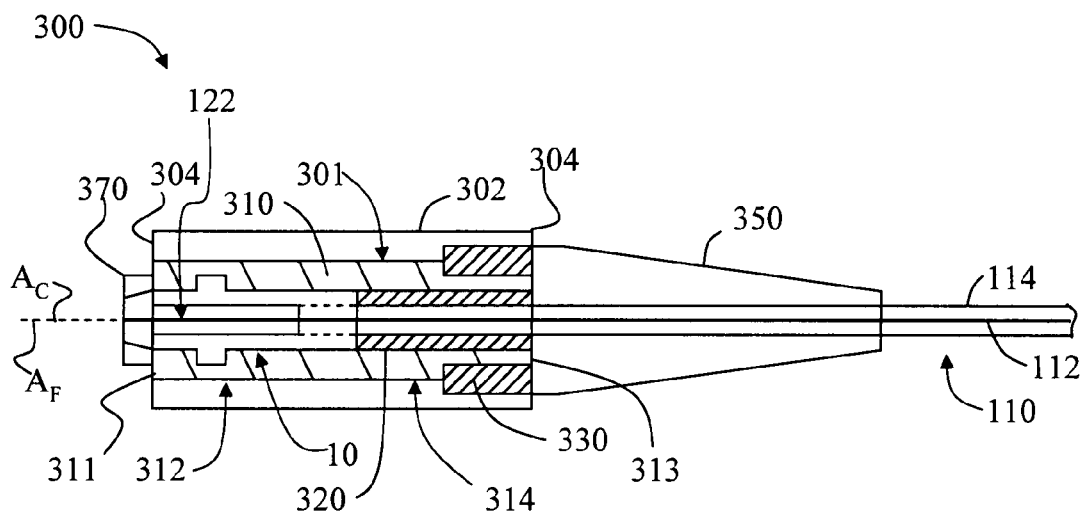
FIG. 9 is a schematic cross-sectional diagram of a simplified fiber optic connector according to the present invention that includes the mechanical splice assembly and index-matching gel of the present invention.

FIG. 9 is a schematic cross-sectional diagram of a simplified fiber optic connector 300 according to the present invention that includes mechanical splice assembly 10. Connector 300 includes a connector housing 302 having an interior 301, front and back ends 304 and 306 and a central axis $A_C$ that runs through the interior. Housing 302 houses in interior 301 a ferrule holder 310 that has a front end 311 with a front-end portion 312 sized to accommodate mechanical splice assembly 10. Ferrule holder 310 also includes a back end portion 314 with a back end 313 sized to receive a support ferrule 320 that in turn is sized to hold a field fiber cable—which in the present example embodiment is a nanostructured fiber cable 110.

Connector 300 also includes a crimp ring 330 arranged around ferrule holder 310 at back end 314. Crimp ring 330 is crimpled to cause the back portion of ferrule holder 310 and support ferrule 320 held therein to squeeze nanostructure optical fiber 110 in order to provide strain-relief. A flexible connector tail 350 is connected to housing back end 306 and to nanostructure optical fiber cable 10 to provide further stress relief. Housing front end 304 includes an alignment member 370 that serves to align and hold connector 300 to another connector or to the device port to which connector 300 is to be connected.

Connector 300 is particularly well-suited for use in the field where nanostructure optical fiber cables are used as field cables. Connector 300 can be field-installed on a nanostructure field cable using the same or similar techniques used to field-install conventional SC, LC and ST®-compatible connectors, such as for example Corning UniCam® Connectors, made by Corning Cable Systems, Hickory, N.C.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An index-matching gel for use with a nanostructure optical fiber, comprising:
  a polymer-based gel having at least one polymer component with a viscosity η at 25° C. wherein 3 Pa-s≦η≦100 Pa-s, wherein the nanostructured fiber has a core with a refractive index, and wherein the gel has a refractive index within 5% of the core refractive index at an operating wavelength of the fiber.

2. The index-matching gel of claim 1, wherein 5 Pa-s≦η≦50 Pa-s.

3. The index-matching gel of claim 2, wherein 5 Pa-s≦η≦20 Pa-s.

4. The index-matching gel of claim 1, wherein the at least one polymer component includes a siloxane polymer.

5. The index-matching gel of claim 4, wherein the at least one polymer component has a molecular weight Mw>25,000 daltons.

6. The index-matching gel of claim 1, wherein the at least one polymer component is selected from the group of polymer components comprising: polybutenes, (meth)acrylates, acrylics, epoxies, polyesters, polyethers, polycaprolactones, polycarbonates, polybutadienes, polyurethanes, and natural hydrocarbons.

7. A mechanical splice assembly for mechanically splicing a nanostructure optical fiber with an end, comprising:
  a body having a central axis, opposite front and back ends, an interior chamber between the front and back ends, and front and rear channels open to the chamber interior and open at the front and back ends;
  a fiber stub having opposite front and rear ends and disposed in the front channel so that the fiber stub front end is at the body front end and the fiber stub rear end is within the interior chamber; and
  an index matching gel contained in the interior chamber, the index-matching gel comprised of at least one polymer component having a viscosity η at 25° C. such that 3 Pa-s≦η≦100 Pa-s, and wherein the index-matching gel resides between the fiber stub rear end and the nanostructure fiber end so as to provide index matching between the stub optical fiber and the nanostructure optical fiber.

8. The assembly of claim 7, wherein the stub optical fiber is a nanostructure optical fiber.

9. The assembly of claim 7, further including:

a nanostructure optical fiber having an end and a nanostructure region with voids, wherein the nanostructure optical fiber is disposed within the rear channel so that the nanostructure fiber end is interfaced with the stub fiber end and so that the index-matching gel provides index-matching between the fiber stub rear end and the nanostructure fiber end without substantially filling the voids.

10. The assembly of claim 7, further including:

a nanostructure optical fiber having an end and a nanostructure region with voids, wherein the nanostructure optical fiber is disposed within the rear channel so that the nanostructure fiber end is interfaced with the stub fiber end and so that the index-matching gel provides index-matching between the fiber stub rear end and the nanostructure fiber end, and wherein the index-matching gel migrates into the voids to a maximum depth $D_M$ as measured from the nanostructure fiber end, wherein the depth $D_M$ does not extend beyond the body back end.

11. The assembly of claim 7, wherein the at least one polymer component includes a siloxane polymer.

12. The assembly of claim 7, wherein the gel does not substantially penetrate the nanostructure optical fiber.

13. A fiber optic connector, comprising:

the mechanical splice assembly of claim 7;

a holder for holding the mechanical splice assembly, the holder having a back end portion configured to support an optical fiber cable; and a housing that houses the holder.

14. The fiber optic connector according to claim 13, further including:

a nanostructure optical fiber cable that includes the nanostructure optical fiber having a nanostructure region with voids, wherein the cable is supported by the holder back end portion such that the nanostructure optical fiber is disposed within the rear channel with the nanostructure optical fiber end interfacing with the fiber stub end and substantially index-matched thereto by the index-matching gel.

15. The fiber optic connector according to claim 14, further including:

a boot having an end, the boot covering the channel back end and a portion of the nanostructure optical fiber cable; and wherein the index-matching gel migrates into the voids to a depth $D_M$ as measured from the nanostructure fiber end, and wherein the depth $D_M$ does not extend beyond the boot end.

16. The mechanical splice of claim 7, wherein the body comprises a ferrule.

17. The fiber optic connector of claim 13, wherein the holder includes a ferrule.

18. A fiber optic connector having a back end, comprising:

a stub optical fiber having an end;

a field optical fiber having a nanostructure region with voids and having an end;

a splice assembly configured to interface the stub and field optical fibers together at their respective ends; and a polymer-based index matching gel provided at the interface of the stub and field optical fibers, the gel having at least one polymer component with a viscosity η at 25°C. wherein 3 Pa-s≦η≦100 Pa-s.

19. The fiber optic connector of claim 18, wherein field optical fiber extends from the connector back end, and wherein the index-matching gel migrates into the voids to a depth $D_M$ that does not extend beyond the connector back end.

* * * * *